United States Patent
Geldhauser et al.

(10) Patent No.: US 11,198,265 B2
(45) Date of Patent: Dec. 14, 2021

(54) LIFT-OFF METHOD BY MEANS OF JETTING

(71) Applicant: Optics Balzers AG, Balzers (LI)

(72) Inventors: Tobias Geldhauser, Wangs (CH); Olga Kurapova, Walenstadt (CH)

(73) Assignee: OPTICS BALZERS AG, Balzers (LI)

(*) Notice: Subject to any disclaimer, the term of this patent is extended or adjusted under 35 U.S.C. 154(b) by 0 days.

(21) Appl. No.: 17/052,552

(22) PCT Filed: Apr. 24, 2019

(86) PCT No.: PCT/EP2019/025119
§ 371 (c)(1),
(2) Date: Nov. 3, 2020

(87) PCT Pub. No.: WO2019/214844
PCT Pub. Date: Nov. 14, 2019

(65) Prior Publication Data
US 2021/0170704 A1    Jun. 10, 2021

(30) Foreign Application Priority Data

May 7, 2018    (DE) .......................... 102018110954.7

(51) Int. Cl.
*B29D 11/00* (2006.01)
*B05D 1/32* (2006.01)
(Continued)

(52) U.S. Cl.
CPC ........ *B29D 11/00923* (2013.01); *B05D 1/327* (2013.01); *G02B 1/11* (2013.01); *G02B 1/12* (2013.01); *G02B 5/20* (2013.01)

(58) Field of Classification Search
CPC .... B29D 11/00923; B05D 1/327; G02B 1/11; G02B 5/20; G02B 1/12
See application file for complete search history.

(56) References Cited

U.S. PATENT DOCUMENTS

| 5,883,011 A * | 3/1999 | Lin ................... H01L 21/32139 438/747 |
| 7,648,808 B2 * | 1/2010 | Buchsbaum ............. G02B 1/11 430/7 |

(Continued)

FOREIGN PATENT DOCUMENTS

| DE | 102004034418 A1 | 2/2006 | |
| DE | 102013008486 A1 * | 11/2014 | ............... G02B 1/12 |
| DE | 102013008486 A1 | 11/2014 | |

OTHER PUBLICATIONS

Herrmann et al. (DE 102013008486 A1, Computer Translation via EPO created Apr. 24, 2021). (Year: 2021).*

(Continued)

*Primary Examiner* — Nadine G Norton
*Assistant Examiner* — Christopher Remavege
(74) *Attorney, Agent, or Firm* — Pearne & Gordon LLP

(57) ABSTRACT

A method for structured coating of a surface of a substrate. The surface includes spaced optical elements and at least partially metallic elements provided adjacent the optical elements. After the application of the method, the optical elements should be completely covered with the coating, whereas at least some of the metallic elements should not be coated on the major part of their surface. The method includes: a) providing the substrate with the spaced optical elements and metallic elements; b) applying a sacrificial material to at least some of the metallic elements to form sacrificial spots; c) coating the surface of the substrate with a layer system; and d) detaching the sacrificial spots from the substrate, wherein the regions of the layer system on the sacrificial spots are also detached from the substrate. The application of the sacrificial material is carried out at least partially by jetting.

2 Claims, 3 Drawing Sheets

(51) Int. Cl.
     *G02B 1/11*           (2015.01)
     *G02B 1/12*           (2006.01)
     *G02B 5/20*           (2006.01)

(56) References Cited

U.S. PATENT DOCUMENTS

| | | | |
|---|---|---|---|
| 8,912,617 B2* | 12/2014 | Zhang | H01L 31/022425 |
| | | | 257/437 |
| 2005/0136358 A1* | 6/2005 | Paul | H01L 21/76802 |
| | | | 430/311 |
| 2006/0014087 A1* | 1/2006 | Wittenberg | C23C 14/042 |
| | | | 430/7 |
| 2017/0125745 A1* | 5/2017 | Lee | H01L 51/0004 |

OTHER PUBLICATIONS

International Search Report for PCT/EP2019/025119 dated Jul. 10, 2019.
Written Opinion for PCT/EP2019/025119 dated Jul. 10, 2019.

\* cited by examiner

| pattern | 2 dots |  |
|---|---|---|
| | 3 dots |  |
| | 4 dots (sequence 1-2-3-4 or 1-4-2-3) |  |
| | 1 line |  |
| | 2 lines |  |

| pattern, at room temperature and 60°C | 2 dots |  |
|---|---|---|
| | 3 dots |  |
| | 4 dots (sequence 1-2-3-4 or 1-4-2-3) |  |
| | 1 line |  |
| | 2 lines |  |

LIFT-OFF METHOD BY MEANS OF JETTING

The present invention relates to a method for producing a structure on a surface.

The present invention essentially relates to a substrate, on the surface of which a plurality of raised optical elements made of transparent plastic is arranged. The optical elements are spaced so that further elements can be arranged between them. For example, these can be metallic contacts.

The raised optical elements often have to be coated with a thin layer system. This can be, for example, an anti-reflective coating or an optical filter can be implemented on these optical elements, which filter is only transparent for predefined wavelength ranges, whereas other wavelengths of the electromagnetic radiation are reflected and/or absorbed. As a rule, such thin-film systems comprise non-conductive dielectric layers. It is clear that the metallic contacts in the end product must not be covered by the thin-film system, since otherwise they can no longer serve as metallic contacts.

In practice there is an extensive coating of the substrate surface with subsequent structuring around the regions of the metallic contacts. The lift-off technique is often used in this case, with the metallic contacts being locally covered with a sacrificial material before the thin-film system is applied. After the application of the thin-film system, the surface is treated by a detachment process which attacks the sacrificial material and preferably removes it in such a way that the thin-film layers above are also removed locally.

One difficulty is that neither the optical elements nor the metallic contacts can be attacked by the detachment process. Another difficulty arises when the gaps between the optical elements and the metallic contacts are very small. Then it must be ensured during the detachment process that parts of the thin film system in the edge regions of the optical elements are not removed as well. On the other hand, care must also be taken to ensure that the metallic contacts are no longer completely covered by the thin film material.

The object of the present invention is to provide a method which allows to overcome at least partially and preferably completely the difficulties described above.

According to the invention, the object is achieved by a method according to claim 1. The dependent claims relate to advantageous embodiments of the method according to the invention.

In the method according to the invention, the local application of the sacrificial material is based on the contactless dosing which is also known as jetting. With this method, also known as contactless dosing, a dosed, coherent amount of liquid is released, i.e. completely detached from the dosage opening, shot towards the destination. In this way, regions can be specifically covered with the sacrificial material (for example, the metallic contacts), whereas other regions (for example, on and in the vicinity of the optical elements) are not covered with sacrificial material. The regions specifically covered with sacrificial material are referred to as sacrificial spots in the following. According to the invention, the volume and the positioning of the amount of liquid are now chosen so that the sacrificial spots thus created do not completely cover the metallic contacts in the direction of the optical elements. This is based on the inventors' idea that, when the sacrificial spots are removed after the thin film layer system had been applied, some more thin film material is removed than it corresponds to the surface of the sacrificial spots. The procedure according to the invention ensures that even with a very small spacing between the metallic contacts and the optical elements, the optical elements are still reliably completely covered with the thin film layer system after the detachment process. This is not only to ensure that the optical functionality remains constant over the entire optical element, but also to ensure the protective function of the thin film layer system against environmental influences over the entire optical element and preferably even a little beyond the edge.

According to a preferred embodiment of the present invention, first liquid doses of the sacrificial material are first applied separately from one another. Only after these first liquid doses, which are initially applied separately from one another, have at least partially hardened, second liquid doses which overlap partially with the first liquid doses, will be applied. This has the great advantage that the first liquid doses and second liquid doses essentially do not flow into one another and therefore do not spread out in an uncontrolled manner. In this way, the extent of the sacrificial spots can be selected very precisely. The first liquid doses and the second liquid doses can have the same volume. However, they preferably have different volumes and the volume of the second liquid doses is particularly preferably greater than the volume of the first liquid doses. The first liquid doses and/or the second liquid doses can consist of a plurality of smaller individual doses dispensed one after the other.

According to a further preferred embodiment of the present invention, the sacrificial material contains ferromagnetic particles. This opens up the possibility of using magnetic forces (for example due to the strong field of an electromagnet) in order to detach the sacrificial spots from the material below without the need to use a solvent.

The invention will now be described in detail with reference to embodiments and with the aid of the figures.

Figure 1:
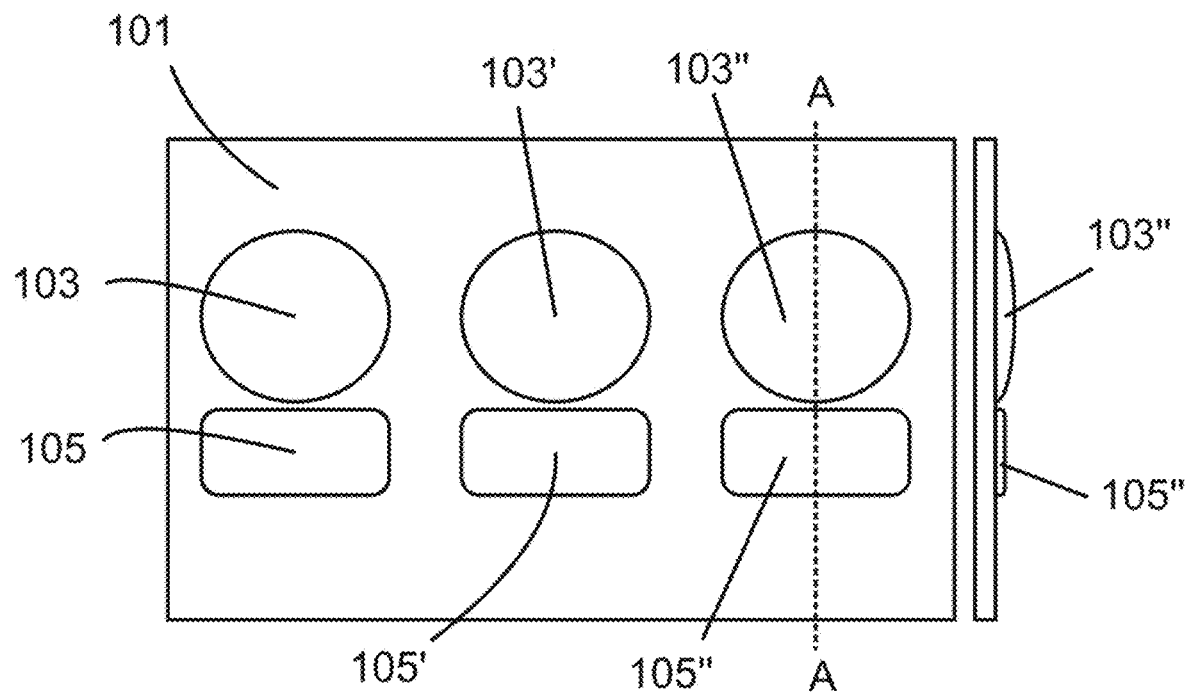
FIG. 1 shows a substrate with optical elements and metallic contacts.

FIG. 1 shows a substrate 101 with optical elements 103, 103', 103" and metallic contacts 105, 105', 105". On the right edge, FIG. 1 shows a section along the line AA, illustrating the short distance between the optical element 103" and the metallic contact 105". In the first embodiment, the substrate is a glass substrate and the optical elements are epoxy lenses with a height of approx. 100 micrometers. The optical lenses can also consist of other materials, in particular polymeric materials. The metallic contacts are gold contacts, with the minimum distance from the lens edge to the edge of a gold contact corresponding to approximately 250 micrometers.

The epoxy lenses should now be covered with an anti-reflection layer (AR layer) having a thickness of approx. 1 micrometer. Since this AR layer also has the task of protecting the epoxy lenses from harmful environmental influences (in particular to serve as a water barrier), the AR layer must cover the epoxy lenses completely up to the edge and beyond it. At the same time, the gold contacts should be free of AR coating.

For this purpose, the metallic contacts are covered with sacrificial spots as described above. According to the invention, however, the metallic contacts are not completely covered, but the sacrificial spot is applied in such a way that in the edge region of a metallic contact to be applied with sacrificial material, which edge region faces an optical element, at least a part of the facing edge region is not covered with sacrificial material, that means that the corresponding part of the facing edge area remains free of sacrificial material.

The sacrificial spot is applied by means of jetting. In the example, the sacrificial material is a photoresist. Commercial photoresists such as AZ 1505, AZ 1518, AZ 4533, AZ 4562 can be used for this. AZ 1505 and AZ 4562 delivered the best results.

The way of jetting also affects the result. You can jet in dots or in lines. In the context of this description, "jetting in lines" means that a line of dots is successively applied next to each other in an overlapping manner on a contact before sacrificial material is applied to the next contact. "Jetting in dots" means that sacrificial material is applied in the form of isolated dots and only after these isolated dots have at least partially cured further dots will be applied. For example, in the case of a row of contacts, dot 1 is applied first, the dots partially cure during the time required for the application on several contacts, before the second dot is applied to these contacts of the row and so on. In the case of jetting, dots can generally be applied by an individual volume or by several individual volumes directly in succession.

Figure 2:
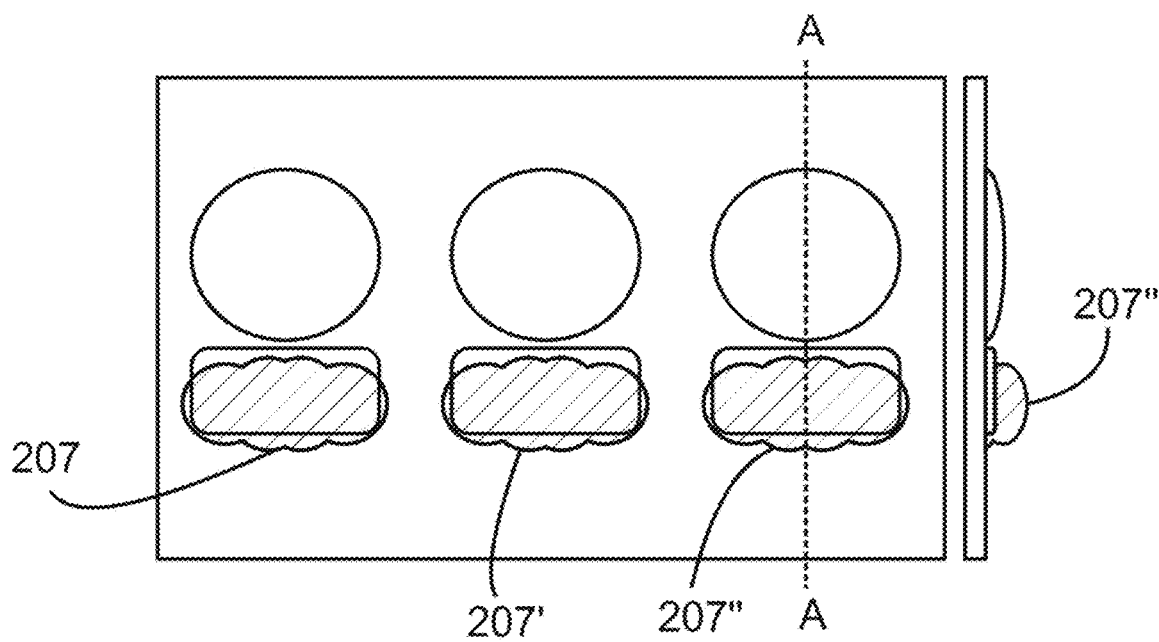
FIG. 2 shows the substrate of FIG. 1 and additionally sacrificial spots.

FIG. 2 shows the substrate again. For reasons of clarity, reference symbols have been omitted with regard to substrate, optical elements and metallic contacts. The sacrificial spots 207, 207', 207", which do not completely cover the metallic contacts upwards, are clearly visible. "Upwards" means in the direction of the optical elements. In the present example, the sacrificial spots protrude below and laterally beyond the metallic contacts. The whole thing looks as if the respective sacrificial spot was shifted downwards compared to the metallic contact. In this way it is ensured that sufficient sacrificial material can be applied without said material reaching the region of an optical element.

Jetting in lines is possible. In the present case, however, jetting has proven to be advantageous in dots.

Figure 5:
FIG. 5 shows different patterns of jetting with photoresist.
Figure 5:
Figure 5:
Figure 5:
Figure 5:
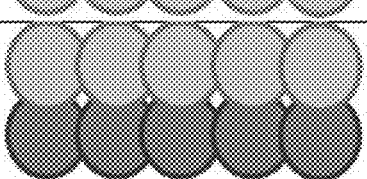
Figure 6:
FIG. 6 shows different patterns of jetting with UV putty.
Figure 6:
Figure 6:
Figure 6:
Figure 6:
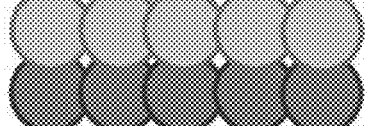

The inventors tested various patterns (1 line, 2 lines, 2 dots, 3 dots, 4 dots in a row, 4 dots with positions 1-4-2-3). FIG. 5 shows the different patterns schematically.

Depending on the varnish, jetting the varnish at an increased substrate temperature can lead to better results in the structures, since the faster drying of the varnish results in steeper angles between the substrate and the surface of the sacrificial spot.

Various curing parameters were examined, such as temperatures of 20° C., 60° C., 70° C. and 80° C. with curing times of 10 min, 30 min and 60 min, or in the case of curing by means of UV radiation with times of 1 min, 5 min and 10 min.

Figure 3:
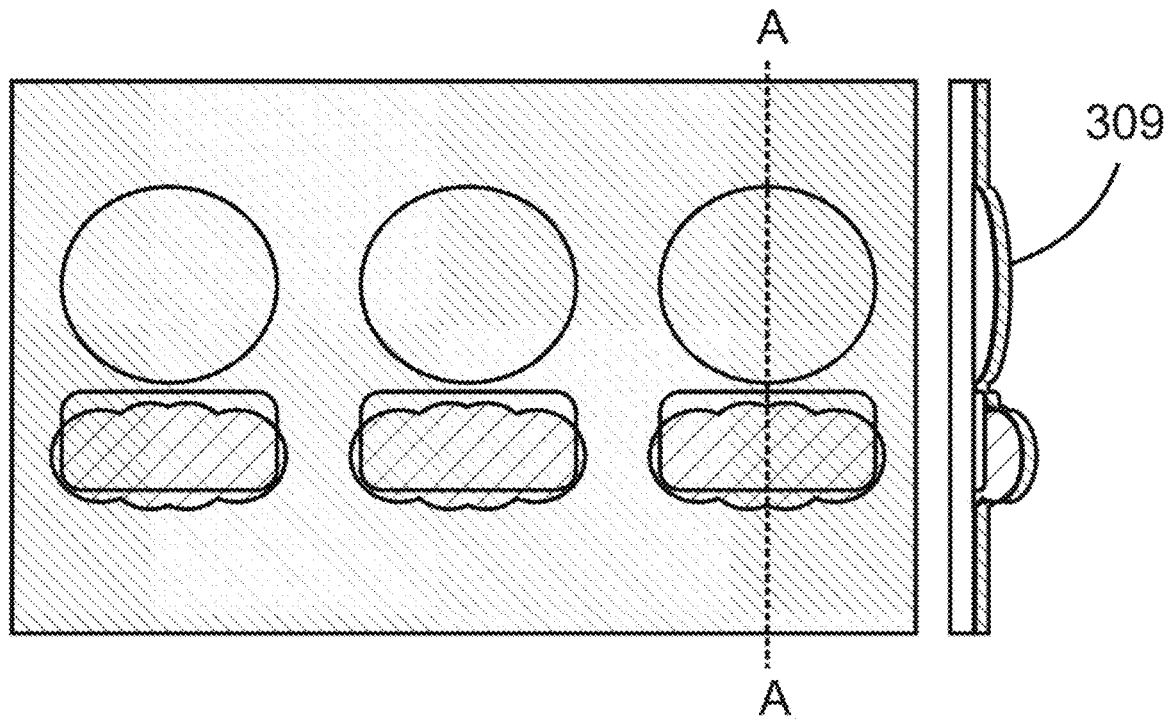
FIG. 3 shows FIG. 2 with an additional coating.

Afterwards, the substrate surface including lenses, metallic contacts and sacrificial spots was coated with an AR layer 309 having a thickness of approx. 1 micrometer. This is shown in FIG. 3 as a hatched area. Cross-section AA illustrates that all elements are coated with AR layer 309, but in the area in which the sacrificial spots have certain steepness, the corresponding layer is significantly thinner and thus more vulnerable. It should be noted that the thicknesses in the cross sections shown are not drawn to scale.

The lift-off process can be carried out, for example, in DMSO at 60° C. The inventors tested the following parameters: different times, with ultrasound (different power levels) or without ultrasound (US). The substrates were then cleaned in water (different temperatures, ultrasonic power levels and times). In the end, the substrates were again subjected to ultrasonic cleaning adapted to epoxy lenses, as the following table shows:

| cleaning bath | parameter | parameter value/range |
|---|---|---|
| DMSO | US power level | 0-20 W/l |
| | temperature | 60° C. |
| | time | 0-20 min. partially with and partially without US power |
| DI H20 | US power level | 0-10 W/l |
| | temperature | 45° C. |
| | time | 0-20 min |
| US final cleaning | normal cleaning process of the optical elements | |

Figure 4:
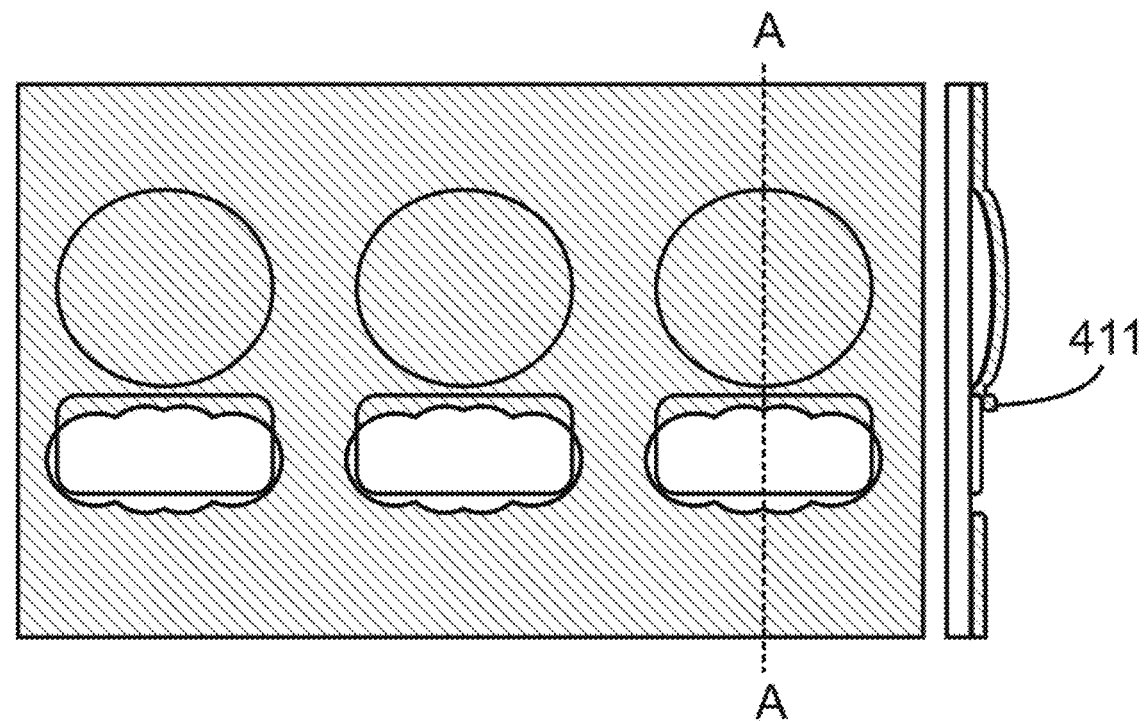
FIG. 4 shows FIG. 3, with the sacrificial spots and the layer above them having been removed.

FIG. 4 illustrates schematically the substrate after the lift-off process. The fact that parts of the metallic contacts in the vicinity of the optical elements, here identified by 411, are still covered with an AR layer is particularly evident in the cross-section AA. There is therefore no risk of parts of the optical elements not being covered with an AR layer.

Another finding was that possible coating residues at the edge of the lift-off region can be removed by a longer residence time in the water. The residence time in the solvent DMSO is not significant for this.

The process as a whole has to be optimized, since a very good jetting process can cause problems with the lift-off. The following table shows the process by which the inventors achieved the best results:

| Best process | |
|---|---|
| photoresist | AZ1518 |
| pattern during jetting | 4 dots, 1-4-2-3 |
| curing | 70° C., 30 min., without UV radiation |
| coating | AR coating |
| Lift-off | DMSO, 60° C.: 5 min. without US power, 7 min. with US power 10 W/l |
| | DI H20: 45° C., US power 10 W/l, 20 min. US final cleaning |

According to a second embodiment of the present invention, UV putty was used instead of photoresist, which among other things leads to the following advantages:

The UV putty is solvent-free. As a result, there is no blistering during the coating caused by any possible degassing solvents;

If the photoresist is not fully cured, degassing of the solvent during the thin-film coating process leads to porous structures in the photoresist, which structures can detach from the substrate during the coating. This problem is avoided by using the solvent-free putty;

The pumping times during the application of the thin layer are not extended by any possible degassing solvents;

The structures are easier to jet;

Only water is needed for the lift-off process.

Difficulties include:

Care must be taken to ensure that the necessary height of the sacrificial spots is reached.

Due to the higher sensitivity of the putty to the surface energy, there can be an increased influence of the surface (raw substrate, coated structures, . . . ) on the shape of the sacrificial spots.

In the example according to this embodiment, the UV putty Mask 20100 was used.

Again, different jetted patterns were tested (1 line, 2 lines, 2 dots, 3 dots, 4 dots in a row, 4 dots with positions 1-4-2-3).

It has been shown that with this putty an increased temperature of the substrate during the jetting, e.g. of 60° C., leads to better results. It has also been shown that the wetting on the gold contacts can be improved by a short oxygen plasma pretreatment (2 minutes, 0.3 mbar) before jetting, so that the shape of the jetted sacrificial spots corresponds to the shape of the jetted sacrificial spots made of photoresist.

Experiments were also carried out by using different curing parameters. For example, it was cured with normal light as well as with UV radiation for 1 min, 2 min and 10 min. Then the substrate surface including lenses, metallic contacts and sacrificial spots was coated with an AR layer 309 having a thickness of approx. 1 micrometer. This is shown in FIG. 3 as a hatched area. Cross-section AA shows that all elements are coated with AR layer 309, but in the region, in which the sacrificial spots have certain steepness, the corresponding layer is significantly thinner and thus more vulnerable. It should be noted that the thicknesses in the cross sections shown are not drawn to scale.

The lift-off process was then carried out in distilled water at 70° C. Experiments were carried out with different lift-off times, both without ultrasound (US) and with ultrasound of different power levels. The substrates were then cleaned in a second bath with distilled water at different temperatures, US power levels and for different periods. In the end, the substrates were again subjected to ultrasonic cleaning adapted to epoxy lenses, as the following table shows:

| cleaning bath | parameter | Parameter value/range |
|---|---|---|
| DI H20 1 | US power | 0-20 W/l |
| | temperature | 70° C. |
| | time | 0-20 min. partially with and partially without US power |
| DI H20 2 | US | 0-10 W/l |
| | temperature | 45° C. |
| | time | 0-20 min |
| US cleaning | normal cleaning process of the optical elements | |

In addition to the development of the jetting and the lift-off process as a whole, due to the increased sensitivity to surface energy, the final substrate must also be taken into account with the UV putty when developing the process. The following table shows the process by which the inventors achieved the best results:

| best process | |
|---|---|
| UV putty | Mask20100 |
| plasma pretreatment | oxygen plasma, 2 min. at 0.3 mbar |
| pattern during jetting | 4 dots, 1-2-3-4 or lines |
| curing | 2 min. UV radiation |
| coating | AR coating |
| Lift-off | DI H20 1, 70° C.: 10 min. without US power, 10. min. US power 10 W/l |
| | DI H20: 45° C., US power 10 W/l, 20 min. US final cleaning |

A method for the structured coating of a surface of a substrate has been described, wherein the surface comprises a plurality of spaced optical elements and at least partially metallic elements are provided between the optical elements, and wherein after the application of the method, the optical elements should be completely covered with the coating, whereas at least some of the metallic elements should not be coated on the major part of their surface, wherein the method comprises the following steps:

a) providing the substrate with the plurality of spaced optical elements and metallic elements b) applying a sacrificial material to at least some of the metallic elements in order to form sacrificial spots c) coating the surface of the substrate with a layer system d) detaching the sacrificial spots from the substrate, wherein the regions of the layer system on the sacrificial spots are also detached from the substrate. The method is characterized in that the application of the sacrificial material is carried out at least partially, preferably completely by jetting.

The jetting can be carried out in such a way that in the edge region of a metallic contact to be applied with sacrificial material, which edge region faces an optical element, at least a part of the facing edge region is not covered with sacrificial material, that means that the corresponding part of the facing edge area remains free of sacrificial material.

In the method, in particular first liquid doses of the sacrificial material can be jetted first separately from one another and, only after partial curing, second liquid doses can be jetted, which overlap at least partially with the first liquid doses.

What is claimed is:

1. A method for the structured coating of a surface of a substrate, wherein the surface comprises a plurality of spaced optical elements and at least partially metallic elements are provided adjacent the optical elements, and wherein after the application of the method, the optical elements are completely covered with a coating, whereas at least some of the metallic elements are not coated on the major part of their surface, wherein the method comprises the following steps:

a) providing the substrate with the plurality of spaced optical elements and metallic elements b) applying a sacrificial material to at least some of the metallic elements in order to form sacrificial spots c) coating the surface of the substrate with the coating forming a layer system d) detaching the sacrificial spots from the substrate, wherein the regions of the layer system on the sacrificial spots are also detached from the substrate, characterized in that the application of the sacrificial material is carried out at least partially by jetting carried out in such a way that in an edge region of one of the metallic contacts to be applied with sacrificial material, which edge region faces one of the optical elements, at least a part of the facing edge region is not covered with sacrificial material such that a corresponding part of the facing edge region remains free of sacrificial material.

2. A method for the structured coating of a surface of a substrate, wherein the surface comprises a plurality of spaced optical elements and at least partially metallic elements are provided adjacent the optical elements, and wherein after the application of the method, the optical elements are completely covered with a coating, whereas at least some of the metallic elements are not coated on the major part of their surface, wherein the method comprises the following steps:

a) providing the substrate with the plurality of spaced optical elements and metallic elements b) applying a sacrificial material to at least some of the metallic elements in order to form sacrificial spots c) coating the surface of the substrate with the coating forming a layer system d) detaching the sacrificial spots from the substrate, wherein the regions of the layer system on the sacrificial spots are also detached from the substrate, characterized in that the application of the sacrificial material is carried out at least partially by jetting in which liquid doses of the sacrificial material are jetted first separately from one another and, only after partial curing, second liquid doses which overlap at least partially with the first liquid doses are jetted.

* * * * *